US009927255B2

(12) United States Patent
Ebert et al.

(10) Patent No.: US 9,927,255 B2
(45) Date of Patent: Mar. 27, 2018

(54) METHOD AND DEVICE FOR CONTROLLING THE DISPLAY OF INFORMATION IN TWO REGIONS OF A DISPLAY AREA IN A TRANSPORTATION DEVICE

(75) Inventors: Andreas Ebert, Braunschweig (DE); Jens Fliegner, Wahrenholz (DE); Christian Bruns, Braunschweig (DE); Martin Bonneberg, Braunschweig (DE)

(73) Assignee: VOLKSWAGEN AG, Wolfsburg (DE)

( * ) Notice: Subject to any disclaimer, the term of this patent is extended or adjusted under 35 U.S.C. 154(b) by 1648 days.

(21) Appl. No.: 11/951,804

(22) Filed: Dec. 6, 2007

(65) Prior Publication Data
US 2008/0284795 A1    Nov. 20, 2008

(30) Foreign Application Priority Data
Dec. 8, 2006 (DE) .......... 10 2006 057 924

(51) Int. Cl.
*G01C 21/36* (2006.01)
*G06F 3/041* (2006.01)
*G06F 3/0488* (2013.01)

(52) U.S. Cl.
CPC ......... *G01C 21/367* (2013.01); *G06F 3/0416* (2013.01); *G06F 3/04886* (2013.01); *G06F 2203/04806* (2013.01)

(58) Field of Classification Search
CPC ....... H04N 5/265; H04N 5/272; G06T 7/0081
(Continued)

(56) References Cited

U.S. PATENT DOCUMENTS 5,638,523 A * 6/1997 Mullet et al. ............. 715/855
5,686,940 A * 11/1997 Kuga ............... G06F 3/04897
345/156
(Continued)

FOREIGN PATENT DOCUMENTS

DE  198 35 422   2/1999
DE  100 58 244   5/2002
(Continued)

*Primary Examiner* — Jeffrey Chow
(74) *Attorney, Agent, or Firm* — Andrews Kurth Kenyon LLP

(57) ABSTRACT

In a method and a device for controlling the display on a display area of a display device in a transportation device, data are generated for the display of a background region and data for the display in a subregion of the display area. The display in the subregion covers the display of the background region, and the display content in the subregion displays at least a portion of the display content of the background region covered by the subregion in a different manner than in the background region. The subregion in the display is shifted relative to the display content of the background region, or the display content of the background region is shifted relative to the subregion, the display content in the subregion being updated in the process, so that, in the new relative position between the subregion and the display content of the background region, it continues to display at least a portion of the display content of the background region covered by the subregion in a different manner than in the background region.

14 Claims, 7 Drawing Sheets

(58) Field of Classification Search
USPC .......................................... 345/629, 660, 667
See application file for complete search history.

(56) References Cited

U.S. PATENT DOCUMENTS

| | | | |
|---|---|---|---|
| 5,729,731 A * | 3/1998 | Yajima et al. | |
| 5,818,455 A * | 10/1998 | Stone et al. | 345/619 |
| 6,401,034 B1 | 6/2002 | Kaplan et al. | |
| 6,417,867 B1 * | 7/2002 | Hallberg | 345/660 |
| 6,590,583 B2 * | 7/2003 | Soohoo | 345/660 |
| 6,725,154 B2 | 4/2004 | Kamikawa et al. | |
| 6,898,523 B2 | 5/2005 | Cochlovius et al. | |
| 6,954,696 B2 | 10/2005 | Ihara et al. | |
| 7,389,003 B2 * | 6/2008 | Yamada | G06T 7/0012 358/453 |
| 2003/0069689 A1 | 4/2003 | Ihara et al. | |
| 2003/0179219 A1 * | 9/2003 | Nakano et al. | 345/660 |
| 2003/0234799 A1 * | 12/2003 | Lee | G06F 3/1407 345/660 |
| 2004/0125138 A1 * | 7/2004 | Jetha et al. | 345/764 |
| 2004/0243306 A1 | 12/2004 | Han | |
| 2005/0049782 A1 * | 3/2005 | Nakano | G01C 21/3647 701/455 |
| 2005/0261822 A1 | 11/2005 | Wako | |
| 2006/0022955 A1 | 2/2006 | Kennedy | |
| 2006/0026521 A1 * | 2/2006 | Hotelling | G06F 3/0418 715/702 |
| 2006/0161871 A1 | 7/2006 | Hotelling et al. | |
| 2006/0174213 A1 | 8/2006 | Kato | |
| 2007/0097109 A1 * | 5/2007 | Shoemaker et al. | 345/418 |
| 2008/0284799 A1 * | 11/2008 | Hollemans | G06F 3/04842 345/660 |
| 2008/0288895 A1 * | 11/2008 | Hollemans | G06F 3/041 715/863 |

FOREIGN PATENT DOCUMENTS

| | | |
|---|---|---|
| DE | 101 55 549 | 5/2003 |
| DE | 103 05 341 | 8/2004 |
| DE | 10 2004 048 956 | 4/2006 |
| EP | 1 288 628 | 3/2003 |
| EP | 1 832 847 | 9/2007 |
| JP | 2003-186392 | 7/2003 |
| WO | 00/23767 | 4/2000 |

* cited by examiner

METHOD AND DEVICE FOR CONTROLLING THE DISPLAY OF INFORMATION IN TWO REGIONS OF A DISPLAY AREA IN A TRANSPORTATION DEVICE

CROSS-REFERENCE TO RELATED APPLICATIONS

The present application claims priority to Application No. 10 2006 057 924.0, filed in the Federal Republic of Germany on Dec. 8, 2006, which is expressly incorporated herein in its entirety by reference thereto.

FIELD OF THE INVENTION

The present invention relates to a method for controlling the display on a display area of a display device in a transportation device, e.g., in which data are generated for the display of a background region and data for the display in a subregion of the display area; the display in the subregion covers the display of the background region, and the display content in the subregion displays at least a portion of the display content of the background region covered by the subregion in a different manner than in the background region. Furthermore, the present invention relates to a device for controlling the display on a display area of a display device in a transportation device, e.g., having a graphics control unit for generating data for the display of a background region and data for the display in a subregion of the display area, the display in the subregion covering the display of the background region, and the display content in the subregion displaying at least a portion of the display content of the background region covered by the subregion in a different manner than in the background region.

BACKGROUND INFORMATION

Methods and devices for controlling the display on a display area of a display device are employed in vehicle navigation systems, for example. The maps displayed in such vehicle navigation systems make it possible for the user to find his bearings. In addition, a route calculated by the vehicle navigation system can be displayed on the map. However, the maps displayed in the vehicle may be used not only for orientation purposes but also for the display of additional information in connection with the map contents displayed on the display area, or other supplementary information with the aid of so-called points of interest and other elements for supplementary information.

In addition, there are navigation systems which can display a section of the displayed map in an enlarged view. However, the rest of the map continues to be displayed at a smaller scale, so that the user will still be able to achieve satisfactory orientation. German Published Patent Application No. 101 55 549, for example, describes a navigation device by which a general map and an enlarged cutaway of the general map can be displayed on a screen simultaneously. In this navigation device, the general map and the enlarged cutaway can be shifted on the screen in synchronism with one another with the aid of a graphics control unit.

SUMMARY

Example embodiments of the present invention provide a method and a device, in which the user or an external unit is able to control the display of the background region and the subregion in a flexible manner so that the user may be supplied with information via the display area of the display device in wide variety of manners.

The method of example embodiments of the present invention is characterized in that the subsection in the display is shifted relative to the display content of the background region, or the display content of the background region is shifted relative to the subregion, the display content in the subregion being updated in the process so that, in the new relative position between the subsection and the display content of the background region, it continues to display at least a portion of the display content of the background region covered by the subregion in a different manner than in the background region.

Thus, the position of the subregion on the display area is able to be shifted while the display content of the background region remains unchanged. Only the visible part of the background region changes to the effect that other regions of the background region will be covered by the shifting of the subregion. At the same time, the display content in the shifted subregion changes to the effect that at least a portion of the currently covered display content of the background region will always be displayed in a different manner.

The display content of the background region may be shifted relative to the subregion in the display if a cutaway of a larger display image is displayed in the background region and if this cutaway is modified by shifting the background region. In so doing, the position of the subregion on the display area remains unchanged. However, the display content in the subregion changes since the shifting of the display contents of the background region has the effect that the particular subregion covers a different section of the background region, and at least a portion in the subregion is displayed in the foreground in a different manner.

The display content in the subregion may display at least a portion of the display content of the background region covered by the subregion at a different scale than in the background region. The different type of display in this case relates to the scale of the display content in the subregion and in the background region. Thus, relative to the background region, the subregion acts as optics, which display the covered section of the background region in enlarged or scaled down form.

The scale of the display in the subregion and/or the scale of the display in the background region may be varied as a function of an input signal. Furthermore, the size and/or the shape of the subregion is able to be varied as a function of an input signal, the scale of the display content in the subregion may remain unchanged in this case.

The input signal may, for instance, be generated by a navigation device for the transportation device. The input signal may be generated directly, on the basis of a user's input.

The inputs of a user for generating the input signal may, for instance, be made by an object or a plurality of objects touching the display area or being brought into close proximity to the display area, the position of the object(s) being detected. In particular, the object may be one or several fingers of a user, which may be brought into close proximity to the display area, or brought into contact with the display area, in order to vary the display on the display area of the display device.

The scale of the display content in the subregion or in the background region may be varied in that the object, in particular the finger of a user, approaches the particular region of the display area. For example, a user is able to enlarge the scale of the display content in the subregion by bringing the finger closer and closer to the subregion shown on the display area.

Geographic information may be shown as display content. For example, a geographic detail map of a covered geographic map of the background region may be displayed in the subregion.

The different type of display of the display content in the subregion and in the background region may also concern the map types that are used in the subregion and in the background region. Road maps and aerial images, for instance, could be used as display types. Furthermore, the display types could include city maps, historical maps showing the geographic region at an earlier time, maps suitable for children, and special maps for specific topics, such as weather maps. The displays could be made using the same scale or using a different scale.

In addition, the detail map may provide more supplementary information, such as points of interest, than the map of the background region. The detail map also may display the supplementary information in a different manner than the map of the background region.

The device according to example embodiments of the present invention is characterized by the graphics control unit being able to generate display data as a function of the input signal, which display the subregion on the display shifted relative to the display content of the background region or the display content of the background region shifted relative to the subregion, updating the display content for the subregion in the process, so that, in the new relative position between the subregion and the display content of the background region, it continues to display at least a portion of the display content of the background region covered by the subregion in a different manner than in the background region.

The display type, in particular the scale of the display in the subregion, and/or the scale of the display in the background region, and/or the size and/or the shape of the subregion may be variable with the aid of the input signal.

The control device may include an interface for the transmission of input signals of other devices. Furthermore, the control device may include an input unit for inputs of a user and for generating the input signal.

The input unit may be a device for detecting the position of an object within the transportation device. The position of this object is in front of the display area, in particular. More specifically, the object may be the finger of a user. The input may thus be accomplished by bringing the finger of the user into specific positions in front of the display area. It is therefore possible to control the display on the display area of the display unit in a simple, rapid and intuitive manner. More particularly, it is not necessary that the user accomplish the operation with the aid of push-button switches, rotary knobs or other physical input devices.

The position detection device may be a touch-sensitive area of the display area. The position detection device may, for instance, be a resistive and/or capacitive touch foil. Furthermore, the position detection device may be a piezoelectric foil. It is possible that the position detection device is able to measure the heat flow created when the finger is touching a foil. Thus, it is possible to detect the touch of an object, in particular a finger of a user, on the display area. The position of the touch of the finger may be related to the instantaneous display content, from which a control signal, in particular the input signal, is obtained.

The position detection device may detect the movement of a finger of a user. It is not necessary for the finger to touch the display area. Instead, it suffices if the finger is moved at a distance in front of the display area.

The input unit may include a device for generating the input signal, by which the input signal is able to be generated as a function of the detected position of the object, in particular the finger of the user, and as a function of the display content.

The input unit may include a proximity sensor, by which the distance of an object, in particular a finger of a user, from the display area is able to be detected. In this case, the input signal may be generated as a function of the distance of the object from the display area.

In addition, example embodiments of the present invention provide a navigation system for a vehicle having the afore-described control device, the input signal for the control device in this case being generated by a unit of the navigation system. Furthermore, in this case display data, which display a geographic detail map of a covered geographic map of the background region in the subregion, are able to be generated with the aid of the graphics control unit.

Example embodiments of the present invention are described in more detail below with reference to the appended Figures.

DETAILED DESCRIPTION

The control device includes a graphics control unit 1 as well as a memory 10 to which the graphics control unit has access. Graphics control unit 1 is connected to a display device 2. Display device 2 may be a liquid crystal display, for example, a plasma display or some other suitable display that is able to be used in a transportation device, in particular a motor vehicle.

Figure 1:
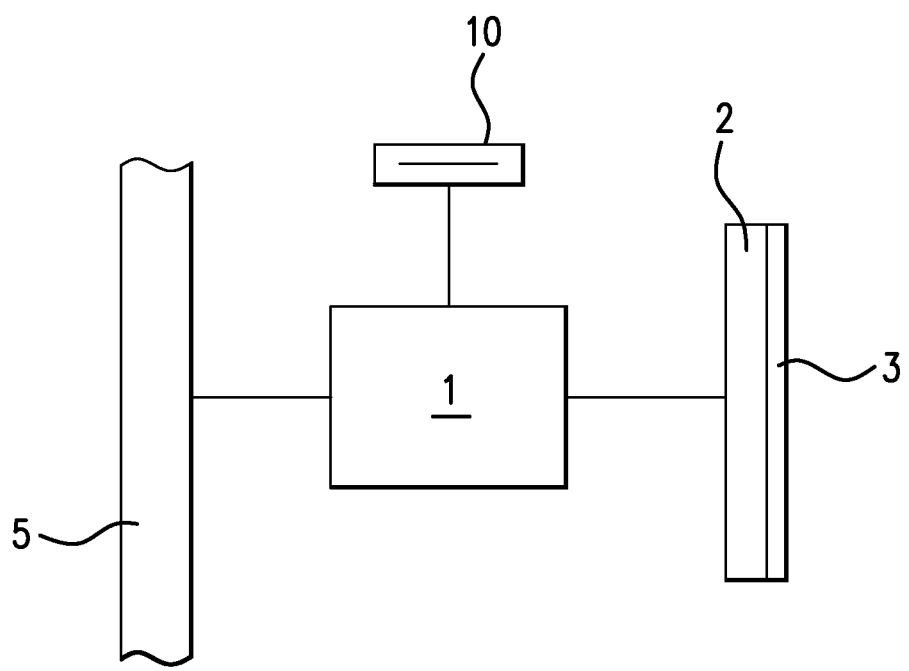
FIG. 1 schematically illustrates a display system, which includes a control device according to an example embodiment of the present invention.

To operate the control device, the exemplary embodiment shown in FIG. 1 provides a touch-sensitive foil 3 in front of the display area of display device 2. With the aid of foil 3 it is possible to detect the position of the touch of an object. The position of the touch may be related to the currently displayed display content on the display area of display device 2, and a control signal, which is transmitted as input signal of graphics control unit 1, is able to be obtained therefrom. Foil 3 may be arranged as a resistive touch foil, a capacitive touch foil or a piezoelectric foil, for example. In addition, foil 3 may be arranged such that a heat flow emanating from the finger of a user, for instance, is measured.

Furthermore, graphics control unit 1 is connected to a vehicle bus 5. Via this vehicle bus 5, input signals such as from a navigation system, for instance, are also transmittable to graphics control unit 1.

Figure 2:
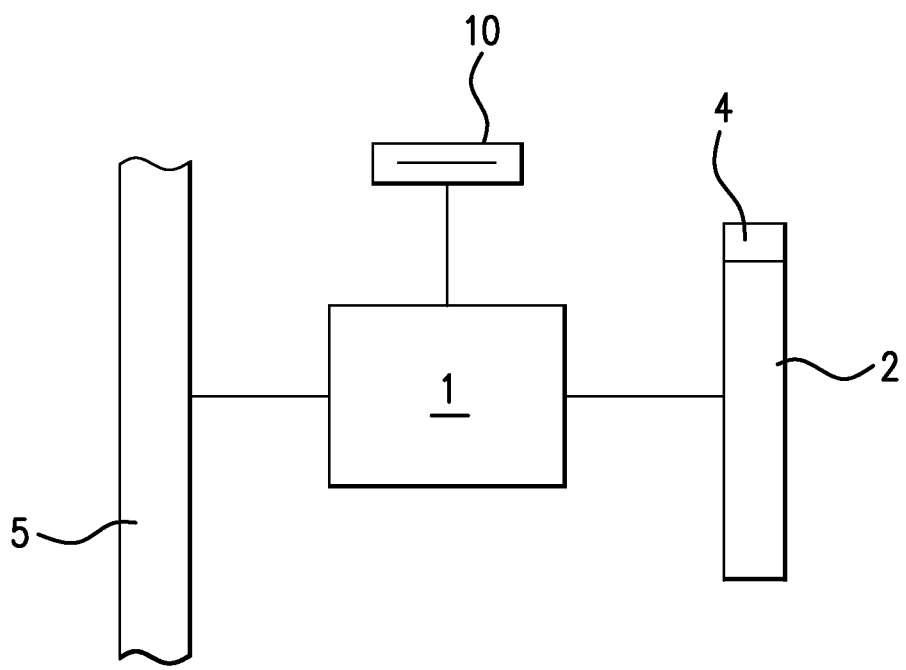
FIG. 2 schematically illustrates a display system, which includes a control device according to an example embodiment of the present invention.

FIG. 2 illustrates an exemplary embodiment, in which no touch-sensitive foil is used as input unit as in the case of the above-described exemplary embodiment, but a device 4 by which the three-dimensional position of an object in a specific region of space in front of the display area of display device 2 is able to be detected, without the display area having to be touched. The permissible region of space depends on the setup of the display area of display device 2 in the motor vehicle. The region of space should be selected such that the presence of an object such as, for example, the finger of a user in this region of space is able to be related in an unambiguous manner to an operation of the control device. The boundary of the region in space may, for instance, be located 40 cm to 10 cm in front of the display area of display device 2.

Position detection device 4 of this exemplary embodiment may include infrared-light sources and infrared-light detectors, for instance. Details of the position detection device are described, for example, in German Published Patent Application No. 100 58 244, which is expressly incorporated herein in its entirety by reference thereto. Additional position detection devices that are able to be used in this exemplary embodiment are described in, for example, German Published Patent Application No. 103 05 341 and German Published Patent Application No. 10 2004 048 956, each of which is expressly incorporated herein in its entirety by reference thereto.

The configuration and method of functioning of the graphics control unit are described in more detail with reference to FIG. 3.

Geographic data in various types of display are stored in memory 10. For example, different road maps using different scales, including city maps as well as maps suitable for children are stored. Furthermore, aerial views and historical maps may be stored. Via vehicle bus 5, an external unit transmits the instantaneous position of the transportation device having the control device to graphics control unit 1, e.g., in a conventional manner. Furthermore, additional information, such as a route and specific inputs for the display of the geographic map, e.g., a default scale, may be transmitted to graphics control unit 1. Based on this information, graphics control unit 1 downloads from memory 10 the cutaway of a road map, for instance, or an aerial view, and generates data for the display of a background region of the display area of display device 2 therefrom.

Via contact-sensitive foil 3 or via device 4 for detecting the position of the finger in front of the display area, the user may select a position of the instantaneously displayed background region. To this end, the position of the finger is assigned to the instantaneous display content on the display area, and an input signal for graphics control unit 1 is generated therefrom. Using this input signal, graphics control unit 1 generates data for the display in a subregion 9 of the display area. This subregion includes the position that was detected by foil 3 or device 4. The size of subregion 9 may be implemented on the basis of preset values. In addition, it is possible that the user specifies the size during the input, for instance by describing the size on the display area by the movement of the user's finger.

Subregion 9 covers the display content of background region 6, so that its display content in subregion 9 will no longer be displayed. However, the display content in subregion 9 depends on the display content of at least a portion of the display content of the background region that is covered by subregion 9. For a portion of the covered display content of background region 6 is displayed in a subregion 9 in a different manner, in particular at a different scale or as a different type of map. In the display at a different scale, a portion of the covered display content of background region 6 is shown in an enlarged view.

Figure 3:
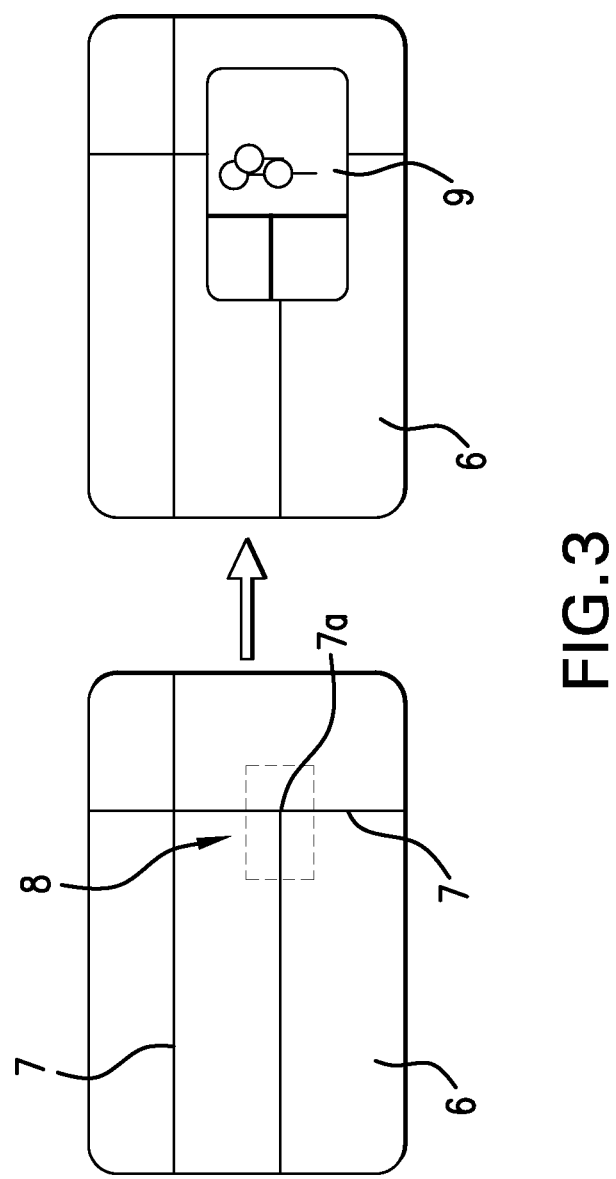
FIG. 3 schematically illustrates two views of the display area of a display device as generated by a method according to an example embodiment of the present invention.

The left image in FIG. 3 illustrates that roads 7 are shown in background region 6 initially. The user selects road turnoff 7a. The driver is interested in receiving a detailed view of this turnoff 7a. From this input signal, graphics control unit 1 generates region 8 outlined by the dashed line.

In connection with the display content of this region 8, the graphics control unit loads from memory 10 a view at a larger scale. From this, graphics control unit 1 generates the data for the display in subregion 9. Since the display content in region 8 of background region 6 is displayed at a larger scale, subregion 9 is larger than region 8. This subregion 9, as shown on the right side of FIG. 3, is displayed on the display area such that turnoff 7a and region 8 outlined by the dashed line are covered. Because of the display at the different scale, the connections at the transition from subregion 9 to background region 6 no longer fit together precisely. However, in subregion 9 the user is given a detail view of region 8 that is particularly relevant for the user. At the same time, the user still has the use of the geographic map of the background region for guidance purposes.

The detail map of subregion 9 shows, in particular, not only an enlarged view of a region of background map 6. Instead, other information than on the background map is also able to be displayed. For example, certain points of interest or other supplementary information may be displayed on the detail map of subregion 9. In addition, points of interest that are already included in background map 6 are able to be displayed in a different manner, in particular in greater detail, in the detail map. Furthermore, a different type of map may be shown. For example, an aerial view may be displayed in subregion 9, if a road map is displayed in the background region and, conversely, a road map may be shown in subregion 9 if an aerial view is shown in background region 6. The user may interact with the control device in order to vary the displayed display contents. The interaction may be implemented with the aid of an external operating unit whose signals are transmitted to graphics control unit 1 via vehicle bus 5. However, the interaction may also take place via touch-sensitive foil 3 or device 4 for detecting the position, such as a finger of the user, in front of the display area.

The user is able to vary the display content of the background region in the following manner:

A cutaway of a larger digital map is shown in background region 6. The user is able to modify this cutaway, i.e., shift it, in particular. The position of subregion 9 remains the same, so that the display content of background region 6 is shifted relative to subregion 9. For example, the user may move his finger on touch-sensitive foil 3 across background region 6 in a specific direction. In this case, the display content of the background region will be generated continuously by graphics control unit 1 such that the display contents follows the movement of the user's finger. At the same time, graphics control unit 1 varies the display contents of subregion 9 such that region 8, outlined by the dashed line, of background region 6 continues to be shown in subregion 9 in an enlarged view. Since the display content of region 8 changes when the display contents of background region 5 is shifted, the display content in subregion 9 changes as well. In this case, subregion 9 acts as a magnifying glass, which focuses on background region 6 located underneath.

Furthermore, the user is able to vary the scale of the display contents of background region 6. To this end, a proximity sensor, which is able to detect the approach of the finger of a user, may be provided, for instance in device 4 or as a separate unit in the example shown in FIG. 1. If the user's finger approaches background region 6 when the control device is in zoom mode, graphics control unit 1 varies the scale of background region 6 in response to the approach of the user's finger, so that additional details become visible in background region 6. Graphics control unit 1 simultaneously varies the display in subregion 9, so that the scale ratio between the display contents in subregion 9 and in background region 6 remains constant.

Furthermore, the user can also shift the position of subregion 9 on the display area. For example, he may touch touch-sensitive foil 3 in subregion 9 and move the finger in a specific direction on the display area. Graphics control unit 1 thereupon generates modified data for the display of background region 6 and subregion 9. The position of subregion 9 is shifted on the display surface, the display content of the background region remaining the same with the exception that other areas are covered by subregion 9. At the same time, graphics control unit 1 continually generates a display content for subregion 9, so that it continually displays a subregion of the covered display content of background region 6 at the scale for subregion 9. In the same manner, the user is also able to vary the size and the shape of subregion 9. In this case as well, the display content for background region 6 and for subregion 9 will be adapted accordingly. Furthermore, as with background region 6, the user may also vary the scale for the display content of subregion 9.

In connection with the various operating options, it is also possible to display operating elements, which are operable by the user's finger, in subregion 9 or in background region 6. It is also possible that touch-sensitive foil 3 or device 4 is able to detect several fingers of a user simultaneously, for instance in order to select a specific cutaway for the detail map of subregion 9.

In addition, there need not be a sharp boundary, as shown in FIG. 3, between the display content of subregion 9 and the display content of background region 6. It is also possible for the two display contents to merge smoothly with one another, in particular the maps at the different scales.

Figure 4:
FIGS. 4 to 7 illustrates additional views of a display area of a display device as generated by a method according to example embodiments of the present invention.

In FIG. 4, a road map is shown in background region 6, and an aerial view at an enlarged scale is shown in subregion 9. In addition, operating elements 11 through 14 are displayed on the display surface. Operating element 11 is used to vary the shape of subregion 9; operating element 12 is used to vary the displayed scale in subregion 9; operating element 13 is used to vary the type of display in background region 6; and operating element 14 is used to vary the type of display in subregion 9.

Figure 5:

FIG. 5 shows a view in which a road map is displayed in background region 6 using a first scale, and a road map is displayed in subregion 9 using a second, larger scale. Furthermore, like in the example shown in FIG. 4, operating elements 11 through 14 are displayed.

Figure 6:
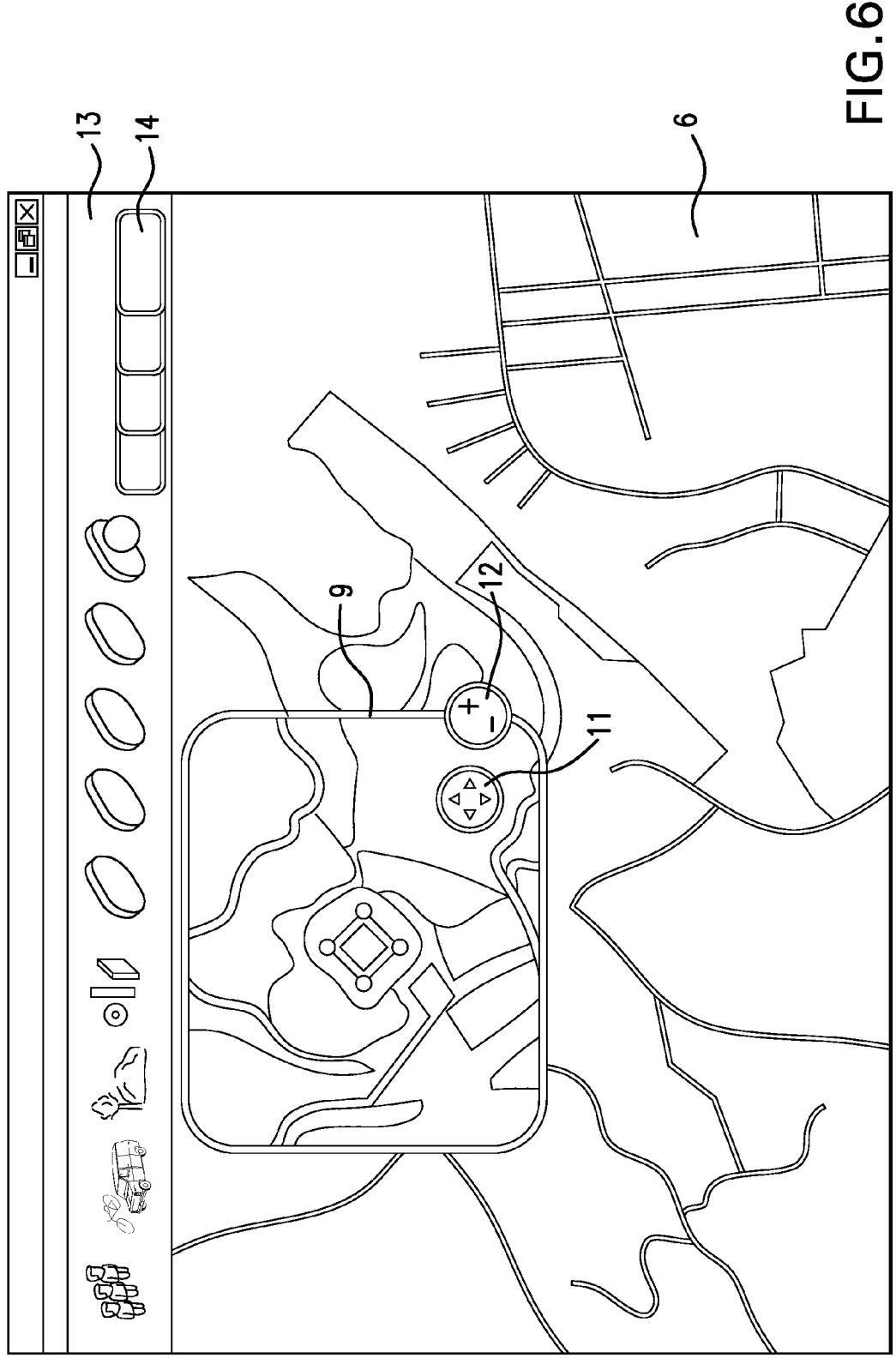

FIG. 6 shows a satellite map in background region 6, and a historical map is shown in subregion 9 at a larger scale. Operating elements 11 through 14 are shown in this case as well.

Figure 7:
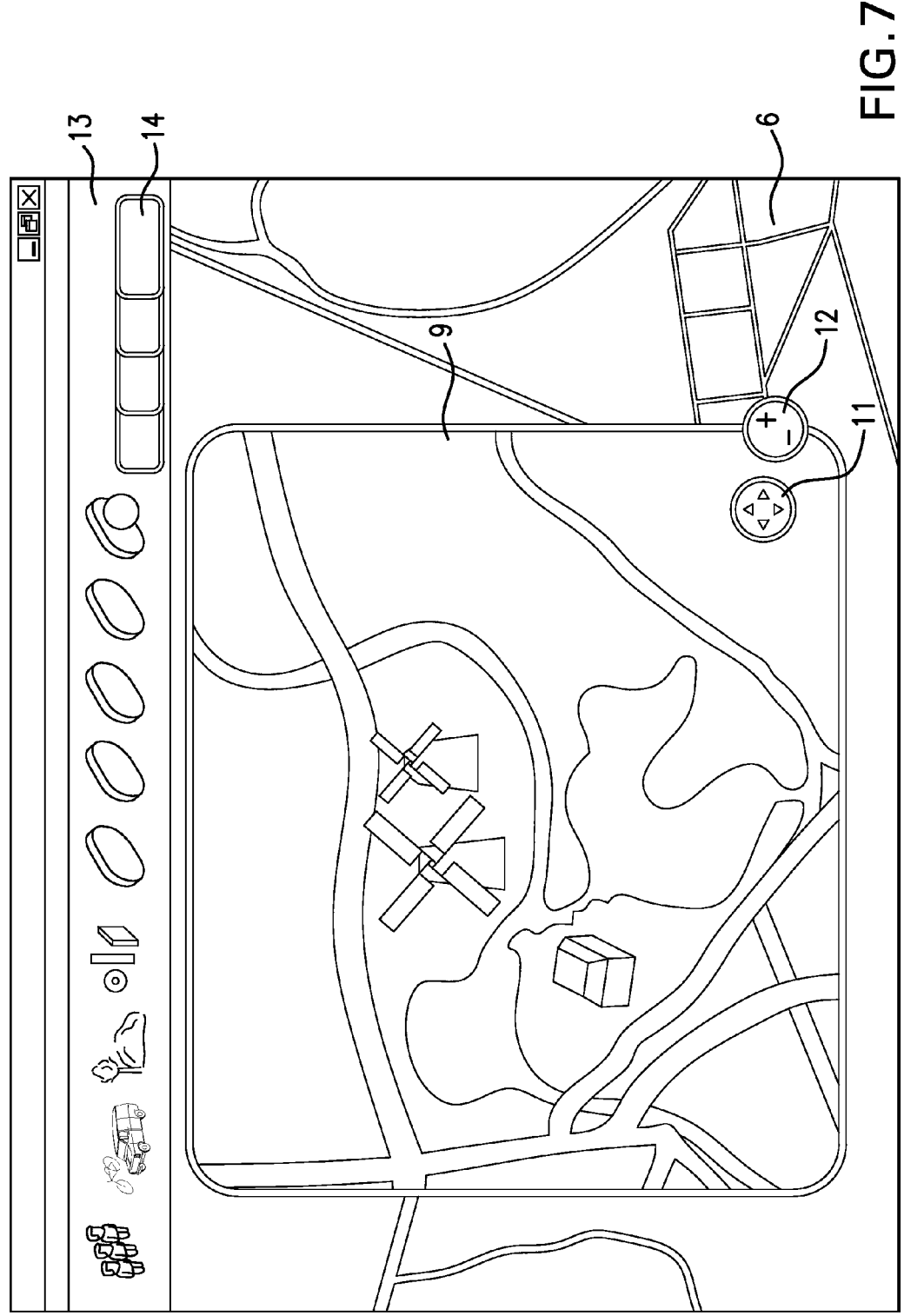

FIG. 7 shows a satellite map in background region 6, and a child-appropriate road map in subregion 9. Operating elements 11 through 14 are also displayed in this case.

LIST OF REFERENCE CHARACTERS

1 graphics control unit
2 display device
3 touch-sensitive foil
4 device for detecting the position of a finger
5 vehicle bus
6 background region
7 display of a road
7a display of a turnoff
8 section of the background region
9 subregion
10 memory
11 operating element
12 operating element
13 operating element
14 operating element

What is claimed is:

1. A method for controlling a display on a display area of a display device in a transportation device, comprising:
   generating, by a graphics control unit, data for displaying a background region and data for displaying a subregion of the display area, the display of the subregion covering the display of the background region;
   displaying in display content in the subregion at least a portion of display content of the background region covered by the subregion in a different manner than in the background region, wherein the display content in the subregion includes at least one image of a different category type than the display of the background region;
   detecting a position of at least one object in the vicinity of the display area;
   detecting a distance of the object from a surface of the display area;
   responsive to the detection of the object, generating an input signal based on the detected distance between the object and the surface of the display area;
   shifting the display content of the background region as a function of the input signal;
   responsive to the shifting the display content of the background region, updating the display content in the subregion so that, in a new relative position between the subregion and the display content of the background region, at least a portion of the display content of the background region covered by the subregion in a different manner than in the background region is continued to be displayed; and
   varying at least one of (a) a category type of the display displayed in the display content in the background region and/or (b) the category type of the display displayed in the display content in the subregion;
   wherein the category type of the display displayed in the display content in the background region is changeable independently from the display displayed in the display content in the subregion and the category type of the display displayed in the display content in the subregion region is changeable independently from the display displayed in the display content in the background region;
   wherein the display content in the subregion is displayed in the displaying step to display at least a portion of the display content of the background region covered by the subregion at a different scale than in the background region; and
   wherein, in a zoom mode, the respective display content in only one of the background region and the subregion is selectively zoomed depending on the detected position of the object in the vicinity of the display area;
   wherein:

the scale of the display content in the subregion increases as the detected distance to the object decreases and the object approaches the subregion; and the scale of the display content of the background region increases as the detected distance to the object decreases and the object approaches the background region.

2. The method according to claim 1, further comprising varying at least one of (a) the scale of the display in the subregion and/or (b) the scale of the display in the background region as a function of the input signal.

3. The method according to claim 1, further comprising varying a shape of the subregion as a function of the input signal.

4. The method according to claim 1, further comprising receiving an input from a user to generate the input signal by touching the display area by at least one object.

5. The method according to claim 1, further comprising displaying in the subregion a geographic detail map of a covered geographic map of the background region.

6. The method according to claim 5, wherein the detail map includes more supplementary information of geography represented by the map than a map of the background region.

7. The method according to claim 6, further comprising displaying the detail map to display the supplementary information in a different manner than the map of the background region.

8. A device for controlling a display on a display area of a display device in transportation device, comprising:
a graphics control unit configured to generate data to display in a background region and data to display in a subregion of the display area, the display in the subregion covering the display of the background region, display content in the subregion including at least a portion of display content of the background region covered by the subregion in a different manner than in the background region, wherein the display content in the subregion includes at least one image of a different category type than the display of the background region;
a position detector configured to detect the position of at least one object in the vicinity of the display area;
a proximity sensor configured to detect a distance of the object from a surface of the display area;
an input unit configured to generate an input signal responsive to the detection of the object, based on the detected distance between the object and the surface of the display area;
the graphics control unit configured to generate display data as a function of the input signal shifting the display content of the background region, to display the display content of the background region shifted relative to the subregion and to update the display content in the subregion, so that, in a new relative position between the subregion and the display content of the background region, the display device continues to display at least a portion of the display content of the background region covered by the subregion in a different manner than in the background region;
the graphics control unit configured to vary at least one of (a) a category type of the display displayed in the display content in the background region and/or (b) the category type of the display displayed in the display content in the subregion;

wherein the category type of the display displayed in the display content in the background region is changeable independently from the display displayed in the display content in the subregion and the category type of the display displayed in the display content in the subregion region is changeable independently from the display displayed in the display content in the background region;

wherein the display content in the subregion is adapted to display at least a portion of the display content of the background region covered by the subregion at a different scale than in the background region; and wherein, in a zoom mode, the respective display content in only one of the background region and the subregion is selectively zoomed depending on the detected position of the object in the vicinity of the display area;

wherein:
the scale of the display content in the subregion increases as the detected distance to the object decreases and the object approaches the subregion; and the scale of the display content of the background region increases as the detected distance to the object decreases and the object approaches the background region.

9. The device according to claim 8, wherein at least one of (a) the scale of the display in the subregion, (b) the scale of the display in the background region, and/or (c) at least one of (i) a size and/or (ii) a shape of the subregion is variable based on the input signal.

10. The device according to claim 8, wherein the position detection device includes a touch-sensitive surface of the display area.

11. The device according to claim 8, wherein the position detection device is configured to detect movement of a finger of a user.

12. A navigation system for a vehicle, comprising:
a device configured to control a display on a display area of a display device in the vehicle, the device including:
a position detector configured to detect the position of at least one object in the vicinity of the display area;
a proximity sensor configured to detect a distance of the object from a surface of the display area;
an input unit configured to generate an input signal responsive to the detection of the object, based on the detected distance between the object and the surface of the display area;
a graphics control unit configured to:
generate data to display of a background region and data to display in a subregion of the display area, the display in the subregion covering the display of the background region,
display content in the subregion adapted to display at least a portion of display content of the background region covered by the subregion in a different manner than in the background region, wherein the display content in the subregion includes at least one image of a different category type than the display of the background region,
generate display data as a function of an input signal shifting the display content of the background region,
display the display content of the background region shifted relative to the subregion and to update the display content in the subregion, so that, in a new relative position between the subregion and the display content of the background region, the display device continues to display at least a portion of the display content of the background region covered by the subregion in a different manner than in the background region, vary at least one of (a) a category type of the display displayed in the display content in the background region and/or (b) the category type of the display displayed in the display content in the subregion;

wherein the category type of the display displayed in the display content in the background region is changeable independently from the display displayed in the display content in the subregion and the category type of the display displayed in the display content in the subregion region is changeable independently from the display displayed in the display content in the background region;

wherein the display content in the subregion is adapted to display at least a portion of the display content of the background region covered by the subregion at a different scale than in the background region; and wherein, in a zoom mode, the respective display content in only one of the background region and the subregion is selectively zoomed depending on the detected position of the object in the vicinity of the display area;

wherein:

the scale of the display content in the subregion increases as the detected distance to the object decreases and the object approaches the subregion; and the scale of the display content of the background region increases as the detected distance to the object decreases and the objection approaches the background region.

13. The method according to claim 1, wherein the at least one image of the different category type includes a historical map containing content older than the display content of the background region and/or a weather map.

14. A method for displaying content in a display device of a transportation device, the method comprising:

displaying a map;

responsive to manipulation of the map, generating, by a graphics control unit, subregion data for a subregion of the map corresponding to the manipulation of the map, wherein the subregion is contained in the background region and the subregion includes more point of interest detail compared with the background region;

updating the display of the map to show the subregion;

detecting a position of at least one object in the vicinity of the display area;

detecting a distance of the object to the display area;

responsive to input requesting a change of a region outside the subregion of the map, updating, by the graphics control unit, the background data, wherein the input is at least one of: shifting and changing a scale of the background data;

updating the display of the map to show changed background data relative to the subregion; and during a zoom mode:

a respective display content in only one of the background region and the subregion is selectively zoomed depending on the detected position of the at least one object in the vicinity of the display area;

increasing the scale of the display content in the subregion as the detected distance to the object decreases and the object approaches the subregion; and increasing the scale of the display content of the background region as the detected distance to the object decreases and the object approaches the background region.

* * * * *